United States Patent [19]

Fitzgerald et al.

[11] 4,003,051
[45] Jan. 11, 1977

[54] EXPANDED RANGE GATE MOVING TARGET INDICATOR

[75] Inventors: John Henry Fitzgerald, Norwalk; Robert Anthony Guarino, Monroe, both of Conn.; Herbert Green, Elmsford, N.Y.

[73] Assignee: United Technologies Corporation, Hartford, Conn.

[22] Filed: Nov. 17, 1975

[21] Appl. No.: 632,879

[52] U.S. Cl. .............................. 343/7.7; 343/17.1 R
[51] Int. Cl.² ............................................ G01S 9/42
[58] Field of Search .................. 343/7.7, 17.1 R

[56] References Cited

UNITED STATES PATENTS

| | | | |
|---|---|---|---|
| 3,713,152 | 1/1973 | Castets | 343/17.1 R |
| 3,765,017 | 10/1973 | Dentino | 343/7.7 |
| 3,797,017 | 3/1974 | Taylor | 343/7.7 |

Primary Examiner—Maynard R. Wilbur
Assistant Examiner—Richard E. Berger
Attorney, Agent, or Firm—Dominic J. Chiantera

[57] ABSTRACT

The range bin width of a range gated moving target indicator (RG-MTI) is expanded to decrease the sensed range resolution to that which is compatible with the displayable range resolution, without limitation by the pulse width of the transmitted radar pulse. A commensurate expansion in the width of the return video signals is provided to prevent loss of target return signal detection due to "straddling" of the return signal by the expanded range bin width.

4 Claims, 2 Drawing Figures

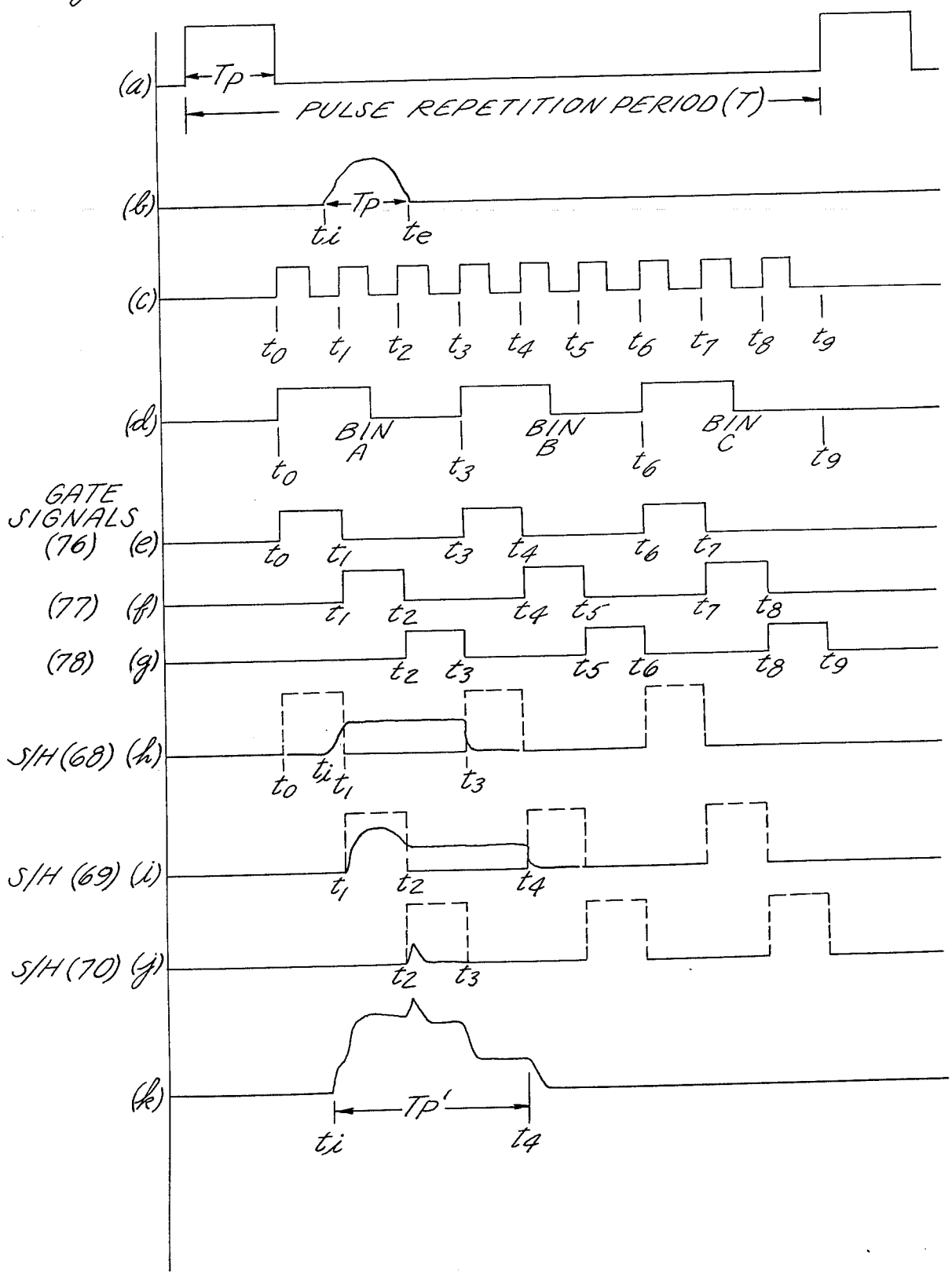

EXPANDED RANGE GATE MOVING TARGET INDICATOR

BACKGROUND OF THE INVENTION

1. Field of Invention

This invention relates to range gated moving target indicators (RG-MTI), and more particularly to an RG-MTI with expanded range gates.

2. Description of the Prior Art

As known in the art, moving target indicators are used to detect moving targets against a clutter background of stationary targets within a region scanned by the antenna, by utilizing the known Doppler frequency technique. In addition, range gated moving target indicators (RG-MTI) are characterized by the ability to provide excellent range resolution of the moving targets, by quantizing the portion of the pulse repetition period during within which the radar target return signals are received, into range internals or bins. The width of each range bin is equal, and defines the time interval within which the range gated filters can sample the radar return video signals. In a conventional RG-MTI the time period of the signal frequency of a highly stable clock oscillator, which controls the transmitter pulse repetition frequency, is used to establish the range time interval. Since the target return signals have a pulse width which is equal to or greater than the pulse width of the transmitted radar pulse, the range bin widths are selected to be less than the transmitted pulse width, to prevent the loss of a target return signal due to "straddling" of the target return signal by a range bin having a time interval larger than the return signal pulse width. Therefore, the pulse repetition period must be quantized into a number of such range bins, all having a time interval less than the pulse width of the main bang signal, with the total number of required range gated filters being equal to the system range coverage divided by the transmitted pulse width. Since each range gated filter circuit is comprised of an input gate, a zero order data hold or box car circuit, a Doppler filter (either analog or digital), and an output gate, the cost of providing the required number of range bin circuits for extended range radar systems becomes appreciable.

As a result of the required narrow range bin widths, the sensed range resolution of the moving target is excellent, however, due to the inability to display the detected target at a resolution comparable to that of the detected range, the overall system resolution is reduced and limited by the displayable resolution. To illustrate, in a typical radar where a 5 mile coverage is displayed, using 200 nanoseconds range bin widths, and a 200 nanosecond transmitted pulse width, the sensed range resolution is approximately 100 feet out of 30,000 feet or 0.3 percent. If the 5 mile coverage is displayed on a typical five inch PPI display, the 0.3 percent resolution represents a display increment of 0.008 inch which, as may be appreciated, is almost imperceptible to the viewer. Typical prior art RG-MTI's correct this invisibility problem by "smearing" the moving target video in the output circuitry of the RG-MTI so that an appropriate size indication appears on the display. This "smearing" in effect, decreases the displayed range resolution of the RG-MTI to generally one to two percent. This reduction in range resolution by "smearing" thereby discards the higher range resolution provided by the narrow range bins, which of necessity must be of a time interval equal to or less than the transmitted pulse width. Thus, it would be preferred to have a system which provides the reduced range resolution required for visibility of displayed target signals by increasing the range bin width, thereby reducing the number of range gated filters, while still preserving the ability to detect target return signals which are smaller in duration than the range bin (prevent "staddle" loss). All of these features may be accomplished in a system which increases the pulse width of the incoming radar video signals by a factor which is equal to the increased range bin width.

One circuit for stretching the radar video return signals in an RG-MTI is described in a patent to Castets et al, U.S. Pat. No. 3,713,152, wherein the radar return signals, after processing in a phase detector which extracts the Doppler frequency component of return video signals, is applied to a number of serially connected delay lines, the output of which are summed and presented to the range gated filter inputs. The number of the delay lines and the delay time constant are selected in dependence on the degree of disparity between the range bin width and the pulse width of the transmitted radar signal. This system suffers from the disadvantage that the series delay lines cause attenuation of the incoming signal and therefore the re-amplification of the signal is necessary. In addition, there is a requirement for using isolators at the input and output of each delay line if the delay lines are not well matched. A further disadvantage appears to reside in the inherent time lag of the low pass filter which couples the stretched video signal from the summing circuit to the range gated filters, which may cause spill over of the video signal into adjacent range bins which adversely affects the range resolution of the system.

SUMMARY OF THE INVENTION

An object of the present invention is to provide a range gated moving target indicator having a range bin width which is greater than the pulse width of the transmitted radar pulse, and limited only by the displayable range resolution of the system, while still providing detection of return video signals having signal widths less than that of the range bin width.

According to the present invention, the range bin width is expanded by increasing the sample time of the range gated filters to a value compatible to that of the displayable resolution of the system, the return video signals being expanded by a commensurate amount through a plurality of sequentially operative sample and hold means which provide overlapping sample and hold values of the video signal to a summing means, the signal holding time and the summation of the plurality of the stored signals providing an expanded video signal to the range gated filters.

The expanded range gate moving target indicator of the present invention permits the reduction of range gate filter circuitry required in a conventional system, by allowing the sensed range resolution to be limited only by the displayable range resolution of the system rather than the pulse width of the transmitted radar energy, with no sacrifice of target detection accuracy, and at a substantial reduction of system cost. The invention may also be added to conventional RG-MTI systems, either analog or digital, to provide expanded range coverage without an increase in the existing number of range gated filters within the system.

Other objects, features and advantages of the present invention will become more apparent in the light of the following detailed description of a preferred embodiment thereof, as illustrated in the accompanying drawing.

BRIEF DESCRIPTION OF THE DRAWING

FIG. 2 is a functional timing diagram of certain elements of the system embodiment of FIG. 1.

DESCRIPTION OF THE PREFERRED EMBODIMENT

Figure 1:
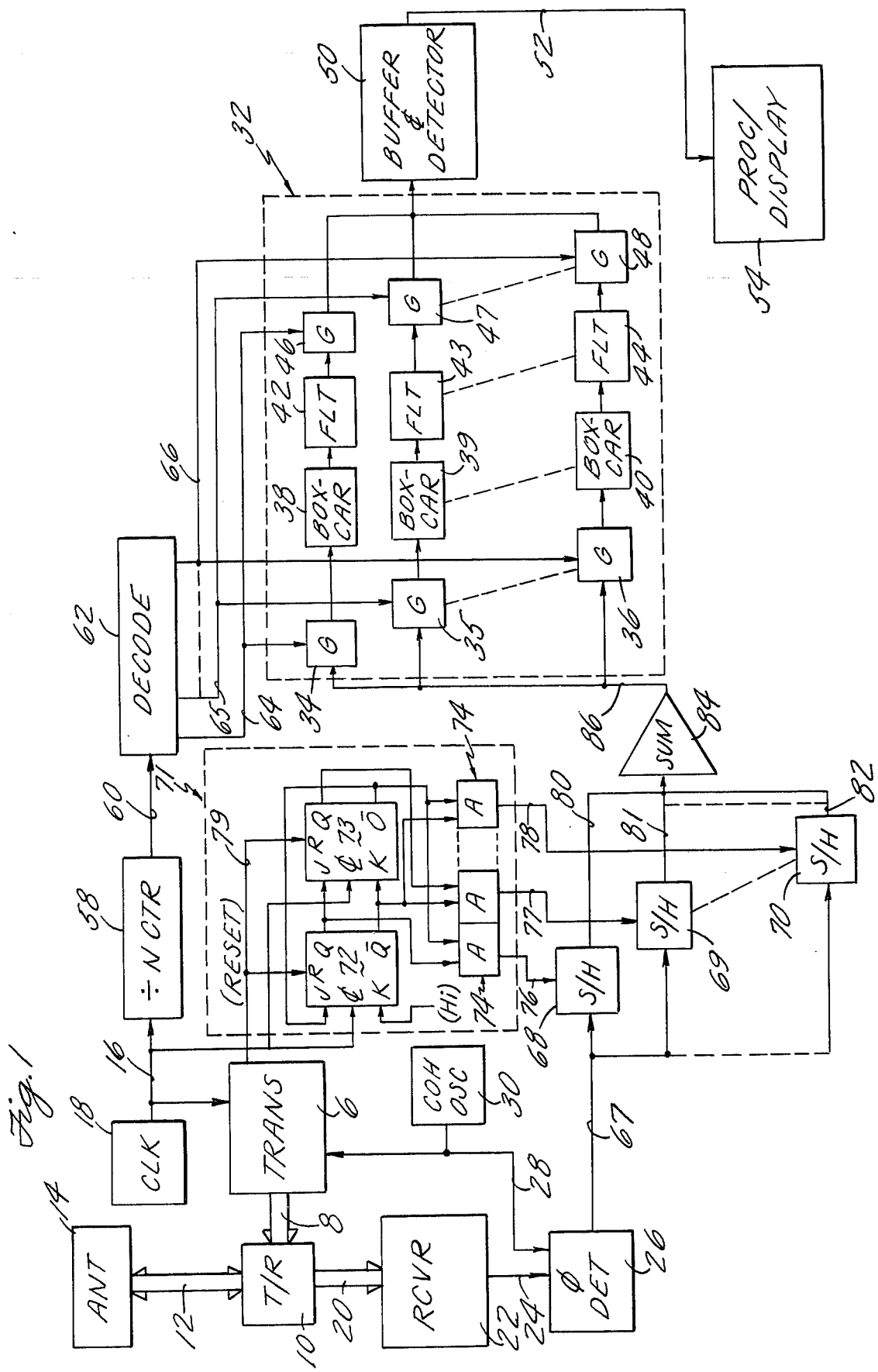
FIG. 1 is a system block diagram of a range gated moving target indicator radar system according to the present invention.

Referring now to FIG. 1, in a range gated moving target indicator (RG-MTI) according to the present invention, a transmitter 6 provides pulsed radar energy, at a defined pulse width and pulse repetition frequency (PRF), through a wave guide 8 to a transmit receive (T/R) switch 10. The T/R switch couples the main bang signal through a wave guide 12 to an antenna 14 which propagates the signal into free space. The PRF of the transmitted radar pulse is controlled by a clock signal provided through a line 16 from a clock oscillator 18, the time period of the clock signal frequency being equal to, or less than the pulse width of the transmitted radar pulse. The clock signal on the line 16 is also used to establish the time intervals of the range bins as described in detail hereinafter. The return radar video signals are received by the antenna 14, and returned through the wave guide 12 and T/R switch 10 to a wave guide 20, which presents the return signals to receiver 22. The return video signals are processed in a well-known manner within the receiver to provide a Doppler frequency component representative of return signals from moving targets, by heterodyning the return video signals with the signal frequency of a stable local oscillator within the mixer stage of the receiver (not shown in FIG. 1) to produce an intermediate frequency (IF) signal. If IF signal is amplified within the receiver 22 and presented through a line 24 to a phase detector 26, which heterodynes the IF signal with a reference signal on a line 28, provided by a coherent oscillator source 30. In a coherent RG-MTI, the reference signal on the line 28 is also presented to the transmitter 10 to establish the carrier frequency within the transmitted radar pulse, so that the transmitted carrier frequency is in phase with the reference signal. The phase detector heterodynes the reference signal with the IF signal, to provide a difference-frequency, which is the Doppler signal frequency. A time varying amplitude of the Doppler signal is indicative of a target return signal from a moving target, as opposed to a constant amplitude Doppler signal produced by a return signal from a fixed target.

Although the embodiment of the RG-MTI of FIG. 1 is of a coherent system, using a coherent oscillator 30 and a phase detector 26 to provide phase detection of the Doppler signal component, the system according to the present invention is not limited to coherent systems. As may be known, the composite return signals from both moving targets and clutter, fluctuates in both phase and amplitude, such that the system of FIG. 1 may also be of a noncoherent type system which is responsive to amplitude fluctuations for detection of the Doppler component, wherein the system embodiment would exclude the coherent oscillator 30 and signal line 28, and the phase detector 26 would be replaced by a linear amplitude detector.

Thus far, the system described is that of a conventional RG-MTI of the pulse modulated type. In such systems the output signal from the phase detector 26 is presented directly to a number of range gated filter circuits, such as the range gated filters 32. These range gated filter circuits quantize the non-pulse portion of the pulse repetition period, or the interval in which return signals are received, into a plurality of successive time increments corresponding to successive range intervals, or range bins. Each range gate circuit opens in sequence once during each pulse repetition period and samples the video waveform coincident with that range bin, corresponding to a different range interval in space. Since the pulse width of the target return signals may only be as large as the pulse width of the transmitted radar pulse, the time increment value of the individual range bins (range bin width) must likewise be limited to a magnitude equal to, or less than the main bang pulse width to prevent a loss in detection of a return signal, resulting from a wide range bin "straddling" a return signal which decreases to a value below the detector threshold during the sampling time of the range gate filter circuit. With the magnitude of the range bin width limited to the pulse width of the main bang, the total number of range gate filter circuits required is dependent on the range of the system, divided by the pulse width of the transmitted radar pulse.

In the embodiment of FIG. 1, only three range gate filters are shown to simplify the embodiment, and to facilitate a clear understanding of the present invention. The range gate filters are comprised of: input gates 34-36, zero-order data hold, or box car circuits 38-40, Doppler filters 42-44, and output gates 46-48. The range bins width is controlled, in a prior art system, by the period of the signal of the clock 18, which sequentially turns on the input gates of the individual range bins. The radar return video signals coincident with the respective range bin are received and stored in the box car circuits for a full pulse repetition period. The output of the box car circuit is presented to the Doppler filter which is a frequency filter of the bandpass type, having a low frequency cutoff value above that of the frequencies of the clutter return signals, and having an upper cutoff frequency greater than the highest value of the anticipated Doppler frequency. The effect of the box car circuit and the Doppler filter is to emphasize the fundamental component of the modulation frequency (the high frequency modulaton signals contained within the main bang pulse) and to eliminate harmonics of the pulse repetition frequency, and the low frequency clutter signals. The bandwidth of the Doppler filter is less than the pulse repetition frequency, and is dependent upon the clutter frequency spectrum. The output signals from the Doppler filters 42-44 are presented through the output gates 46-48, which are turned on simultaneously with the respective input gate, to a full wave linear detector and integrator (low-pass filter) which converts any bipolar video signals to unipolar signals for presentation to a threshold detection circuit, all of which is contained within the buffer and detector circuitry 50. The output signal from the detector circuit 50, representing the detected moving target, is presented through a line 52 to a processing or display apparatus 54.

In an RG-MTI radar system according to the present invention, the number of range gated filter circuits is limited to that required to quantize the return video signals into range bins which provide a range resolution capable of direct display, thereby providing a substantial reduction in cost and system components. This results in range bin widths which exceed the pulse width of the transmitted radar pulse, and to prevent the loss of signal detection due to the "straddle" effect, the received video signal width is likewise expanded by a commensurate amount.

Referring again to FIG. 1, the range bin width is expanded by increasing the clock period (decreasing the clock frequency) prior to presentation to the range bin gates 34–36 and 46–48. The clock signal on the line 16 (FIG. 2, illustration (c)) is presented to a divide by N counter 58, of a type known in the art such as the Fairchild 9392 which reduces the clock frequency (expanding the clock time period) by a factor N, whose value is determined by the amount of expansion of the range bin time interval desired. For the exemplary embodiment of FIG. 1, N = 3, and the divided down signal is shown in FIG. 2, illustration (d). It should be understood, however, that N may be any number, and will be determined by the interrelationships of the pulse width of the transmitted radar pulse, the system range coverage desired, and the required range resolution. The signal from the divide by N counter 58 is provided through a line 60 to decode circuitry 62, of a type well known in the art and which includes a counter for counting successive cycles of the signal on the line 60 and presenting the count to a demultiplexer which provides a number of gate signals (corresponding to the number of range gate filters), each gate signal having an enable portion of a time duration equal to that of the time period of the signal on the line 60. The gate signals are generated on successive cycles of the line 60 signal to provide successive turn on gate signals through the lines 64 through 66 to the input gates 34–36 and output gates 46–48 of the range gated filters 32.

The signal width of the target return video signals is expanded by a commensurate amount by presenting the Doppler video signals from the phase detector 26 through a line 67 to the inputs of three sample and hold (S/H) circuits 68–70. The clock signal on the line 16 is presented to decode circuitry 71, comprising bistable means 72, 73 and AND gates 74 which provides successive, video gate signals on the lines 76–78 to the S/H circuits 68–70 respectively. The video gate signals (shown in FIG. 2, illustrations (e), (f) and (g)) are sequential, and have a time period equal to the period of the divided down clock signal on the line 60 (FIG. 2, illustration (d)) and an enable portion of a time duration equal to the period of the clock signal on the line 16 (FIG. 2, illustration (c)). The decode circuitry 71 is provided with a reset signal on a line 79 from the transmitter 6, to prevent gate signal generation during the transmission of the radar pulse. The output signals from S/H circuits 68–70 are presented through lines 80–82 to a summing means 84, such as an operational amplifier. The output signal of the summing means 84 is provided through a line 86 to the input gates 34–36 of the range gated filters 32.

In operation, the trasmitter 6 provides a main bang pulse having a pulse width $T_p$, and a pulse repetition period T as shown in FIG. 2, illustration (a). The clock signal on the line 16 (FIG. 2, illustration (c)), provides nine cycles within the non-pulse portion of the pulse repetition period $(T-T_p)$, the nine cycles forming time intervals $t_0-t_9$, and each interval being less than the pulse width $T_p$. The output signal of the counter 58 on the line 60 (FIG. 2, illustration (d)) provides three expanded range bins A–C, each one equal to three time periods of the line 16 clock signal as shown. The signal on the line 60 is presented to the decode circuitry 62 which presents gate signals to the range gated filters 32 to provide turn on of the individual range bins for a period corresponding to the period of the divided down clock signal $(t_3-t_0)$. The clock signal on the line 16 is simultaneously decoded by the decode circuitry 71 to provide the video gate signals on the lines 76–78 (FIG. 2, illustrations (e), (f) and (g)) causing sequential sample times of the S/H circuits 68–70, such that each circuit has a sample time equal to one line 16 clock signal period, and a hold time equal to N-1 clock signal periods, which for N = 3 corresponds to two time periods of the clock signal as shown in FIG. 2, illustrations (h), (i) and (j).

For a video target return signal on the line 67, received at a time $t_i$ (FIG. 2, illustration (b)) and having a pulse width equal to that of the main bang pulse width $T_p$, the sample and hold circuit 68, which is on at the time $t_i$, receives that portion of the video signal corresponding to the time interval between $t_i$ and $t_1$ (FIG. 2, illustration (h)), and holds the signal for the time interval $t_1$ to $t_3$, at which time it is again gated on. The S/H circuit 69 receives that portion of the video signal corresponding to the time interval $t_1-t_2$ which is held for the time interval $t_2-t_4$, as shown in illustration (i). The S/H circuit 70 receives the remaining portion of the video signal in the time interval $t_2-t_e$, at which time the video signal magnitude is reduced substantially to zero, such that at the beginning of the hold time for the S/H 70 $(t_3)$ the video magnitude is zero. The summing means 84 (FIG. 1) receives the signal magnitudes on the lines 80–82 (FIG. 2, illustrations (h), (i) and (j)) and provides on the line 86 the sum of these three signals as shown in FIG. 2, illustration (k). The sum signal on the line 86 has a pulse width $T_p'$ equal to the time interval $t_i$ to $t_4$, which exceeds the time interval of the expanded range bins of FIG. 2, illustration (d), thereby insuring detection of the target return video signals by the expanded range bin filters 32. This processing of the video signal through the S/H circuits 68–70, and summing means 84, prior to presentation to the range gated filters, provides an expanded video signal width which is commensurate with the expanded range bin width.

The range gated moving target indicator radar of the present invention, provides for a reduction in the number of range gated filters required to that governed by the displayable range resolution without limitation by the system range and transmitted pulse width, providing a subsequent reduction in system cost. Also, the present invention is adaptable to a conventional RG-MTI system, which, referring again to FIG. 1, is defined as a system wherein the output of the clock 18 on the line 16 would be tied directly to the input of the decoder 62, and the video on line 67 would be presented directly to the range gated filters 32 on the line 86. Through the addition of the divide by N counter 58 to reduce the frequency of the line 16 clock signal prior to presentation through the line 60 to the decoder 62, the addition of S/H circuits 68–70 to process the video signal on the line 67 before presentation through the line 86 to the range gated filters 32, and the addition of the decode circuitry 71 which is responsive to the line 16 clock signal and the line 79 reset signal from the transmitter 6, and which provides the gate signals to the S/H circuits 68–70, expanded range coverage is achieved in a system having a fixed number of range gated filters without a substantial increase in components, or cost.

In addition, the present invention permits the use of a fixed number of range gated filters in an RG-MTI transmitting radar pulse at more than one pulse width (to vary pulse power), without having to use separate range gated filter arrays for each transmitted pulse width, since the expansion of the range bin width, and video signal width is directly proportional to the line 16 clock signal and follows any programmed change in the line 16 signal. Similarly, although the invention has been shown and described with respect to an exemplary embodiment thereof, it should be understood by those skilled in the art that the foregoing and various other changes, omissions and additions in the form and detail thereof may be made therein without departing from the spirit and the scope of the invention.

Having thus described a typical embodiment of our invention, that which we claim as new and desire to secure by Letters Patent is:

1. A range gated moving target indicator radar system, comprising:
    oscillator means for providing a timing signal;
    signal means, including an antenna, a transmitter responsive to said oscillator means for providing to said antenna pulsed radar energy at a prescribed pulse width and pulse repetition period in dependence upon the timing signal for illuminating successive portions of a spatial sector, and a receiver for receiving, during a non-pulse portion of the pulse repetition period, return signals reflected from targets located within the spatial sector, said signal means providing video signals having a Doppler frequency spectrum representative of the return signals from moving targets within the sector;
    gate signal means, responsive to said oscillator means for providing a range gate signal having a time period greater than the period of the timing signal, and greater than the pulse width of the pulsed radar energy, said gate signal means further providing a plurality of sequential, periodic video gate signals having a time period equal to the period of the range gate signal, each video gate signal time period including an enable portion having a time interval equal to the period of the timing signal;
    video processing means, responsive to the video signals from said signal means and the video gate signals from said gate signal means, for expanding the signal width of the video signals to a value commensurate with the time period of the range gate signal; and
    detection means, responsive to the expanded video signals from said video processing means, and including a plurality of range gated filters responsive to the range gate signal for quantizing the non-pulse portion of the pulse repetition period into a plurality of equal, contiguously sequential range intervals having a time duration equal to the range gate signal period, said plurality of range gated filters providing band-pass filtering of the expanded video signals coincident with each of the range intervals, said detection means providing a signal manifestation representative of moving targets detected within the spatial sector.

2. The system according to claim 1, wherein said video processing means comprises:
    a plurality of sample and hold means, one for each of the video gate signals from said gate signal means, each sampling a different portion of the video signal from said signal means in response to the enable portion of the video gate signals and holding the sampled signal in response to the absence of the enable portion; and
    summing means, connected for response to the outputs of said plurality of sample and hold means, for providing a continuous summation of all of said sample and hold means output signals to said detection means.

3. The system according to claim 2, wherein said gate signal means comprises:
    divider means, connected for response to said oscillator means, for dividing said oscillator means timing signal frequency by some factor to provide a lower frequency range gate signal to said detection means; and
    decoder means, connected for response to said oscillator means, for providing the plurality of video gate signals to said video processing means.

4. An improved range gated moving target indicator radar system of the type having an antenna, a clock oscillator for providing a timing signal, a transmitter for providing pulsed radar energy at a prescribed pulse width to the antenna for illuminating successive portions of a spatial sector at a pulse repetition period which is dependent upon the timing signal from the clock oscillator, a receiver for providing video signals representative of moving targets within the spatial sector which are received during a non-pulse portion of the pulse repetition period, and a detector which is responsive to the return video signals and which includes a plurality of range gated filters responsive to the clock oscillator for quantizing the non-pulse portion of the pulse repetition period into a plurality of equal, contiguously sequential range intervals having a time duration substantially equal to the transmitted radar pulse width to provide band-pass filtering of the video signals coincident with each of the range intervals and to provide a signal manifestation representative of moving targets detected within the spatial sector, wherein the improvement comprises:
    gate signal means, directly responsive to the clock oscillator timing signal for providing to the detector a range gate signal having a time period greater than the period of the timing signal, and greater than the pulse width of the pulsed radar energy, said gate signal means further providing a plurality of sequential, periodic video gate signals having a time period equal to the period of the gate timing signal, each video gate signal time period including an enable portion having a time interval equal to the period of the timing signal;
    a plurality of sample and hold means, directly responsive to the video signals from the receiver and the video gate signals from said gate signal means, each sampling a different portion of the video signal from the receiver in response to the enable portion of a different one of the video gate signals and holding the sampled signal in response to the absence of the enable portion; and
    summing means, connected for response to the outputs of said plurality of sample and hold means, for providing a continuous summation of all of said sample and hold means output signals to the detector.

* * * * *